US012700692B2

(12) United States Patent
Fujisaki

(10) Patent No.: US 12,700,692 B2
(45) Date of Patent: Aug. 4, 2026

(54) INSERT-MOLDED CONNECTOR WITH REINFORCING PORTION AT BENT TERMINAL

(71) Applicant: SUMITOMO WIRING SYSTEMS, LTD., Mie (JP)

(72) Inventor: Ryuichi Fujisaki, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 308 days.

(21) Appl. No.: 18/284,197

(22) PCT Filed: Mar. 29, 2022

(86) PCT No.: PCT/JP2022/015649
§ 371 (c)(1),
(2) Date: Sep. 26, 2023

(87) PCT Pub. No.: WO2022/210766
PCT Pub. Date: Oct. 6, 2022

(65) Prior Publication Data
US 2024/0162645 A1 May 16, 2024

(30) Foreign Application Priority Data
Mar. 30, 2021 (JP) ................................ 2021-057826

(51) Int. Cl.
*H01R 13/405* (2006.01)
*H01R 33/06* (2006.01)
*H01R 43/24* (2006.01)

(52) U.S. Cl.
CPC ........... *H01R 13/405* (2013.01); *H01R 33/06* (2013.01); *H01R 43/24* (2013.01)

(58) Field of Classification Search
CPC H01R 13/405; H01R 13/504; H01R 13/5045; H01R 33/06; H01R 43/24
See application file for complete search history.

(56) References Cited

U.S. PATENT DOCUMENTS 5,083,939 A * 1/1992 Ittah .................... H01R 12/777 439/496
5,279,030 A * 1/1994 Ito ...................... B29C 45/1671 439/736

(Continued)

FOREIGN PATENT DOCUMENTS

JP 2009-066858 A 4/2009
JP 2015-106436 A 6/2015

OTHER PUBLICATIONS

Translation of the Written Opinion of the International Searching Authority for PCT/JP2022/015649 (Year: 2022).*

(Continued)

*Primary Examiner* — Tulsidas C Patel
*Assistant Examiner* — Thomas K Quigley
(74) *Attorney, Agent, or Firm* — Venjuris, P.C.

(57) ABSTRACT

It is aimed to further improve the accuracy of the position and orientation of a terminal of a connector. A connector is provided with a terminal including a bent part, a first resin portion for holding a part of the terminal with the bent part exposed to outside, a second resin portion molded with the first resin portion as an insert part, and a reinforcing portion arranged in an inner corner part of the bent part with an outer corner part of the bent part exposed. The bent part and the reinforcing portion are covered by the second resin portion.

13 Claims, 9 Drawing Sheets

(56) References Cited

U.S. PATENT DOCUMENTS

| | | | | | |
|---|---|---|---|---|---|
| 5,560,981 | A * | 10/1996 | Ito | H01R 13/405 428/209 |
| 5,619,012 | A * | 4/1997 | Casali | H01R 43/24 439/721 |
| 5,729,898 | A * | 3/1998 | Ogawa | H01R 43/24 264/272.17 |
| 5,926,952 | A * | 7/1999 | Ito | B29C 45/14639 439/736 |
| 6,527,989 | B1 * | 3/2003 | Onoda | B29C 45/14639 264/277 |
| 8,118,583 | B2 * | 2/2012 | Nagashima | B29C 45/14418 425/467 |
| 8,480,275 | B2 * | 7/2013 | Owen | H01R 43/18 362/546 |
| 8,545,265 | B2 * | 10/2013 | Sakamoto | H01R 13/504 439/606 |
| 8,616,901 | B2 * | 12/2013 | Shindo | H01R 43/20 439/79 |
| 11,070,001 | B2 * | 7/2021 | Kitai | F02D 9/10 |
| 11,095,070 | B2 * | 8/2021 | Ishikawa | H01R 13/582 |
| 2002/0094716 | A1 * | 7/2002 | Miwa | H01R 33/06 439/419 |
| 2004/0063360 | A1 * | 4/2004 | Kikuchi | B29C 45/0046 439/736 |
| 2004/0140115 | A1 * | 7/2004 | Fischer | H01R 13/405 174/532 |
| 2007/0164475 | A1 * | 7/2007 | Nagashima | B29C 45/14418 425/542 |
| 2008/0012173 | A1 | 1/2008 | Asao | |
| 2012/0164851 | A1 * | 6/2012 | Shindo | H01R 43/20 439/55 |
| 2020/0295497 | A1 | 9/2020 | Suzuki | |

OTHER PUBLICATIONS

International Search Report issued on Jun. 21, 2022 for WO 2022/210766 A1 (4 pages).

* cited by examiner

INSERT-MOLDED CONNECTOR WITH REINFORCING PORTION AT BENT TERMINAL

CROSS REFERENCE TO RELATED APPLICATIONS

This application is a national phase of PCT application No. PCT/JP2022/015649, filed on 29 Mar. 2022, which claims priority from Japanese patent application No. 2021-057826, filed on 30 Mar. 2021, all of which are incorporated herein by reference.

TECHNICAL FIELD

The present disclosure relates to a connector.

BACKGROUND

Patent Document 1 discloses a connector in which a resin part is molded with a terminal fitting as an insert part. In the resin part, the terminal fitting is bent into an L shape.

PRIOR ART DOCUMENT

Patent Document

Patent Document 1: JP 2009-066858 A

SUMMARY OF THE INVENTION

Problems to be Solved

It is desired to further improve the accuracy of the position and orientation of a terminal of a connector.

Accordingly, the present disclosure aims to further improve the accuracy of the position and orientation of a terminal of a connector.

Means to Solve the Problem

The present disclosure is directed to a connector with a terminal including a bent part, a first resin portion for holding a part of the terminal with the bent part exposed to outside, a second resin portion molded with the first resin portion as an insert part, and a reinforcing portion arranged in an inner corner part of the bent part with an outer corner part of the bent part exposed, the bent part and the reinforcing portion being covered by the second resin portion.

Effect of the Invention

According to the present disclosure, the accuracy of the position and orientation of a terminal of a connector can be further improved.

DETAILED DESCRIPTION TO EXECUTE THE INVENTION

Description of Embodiments of Present Disclosure

Figure 1:
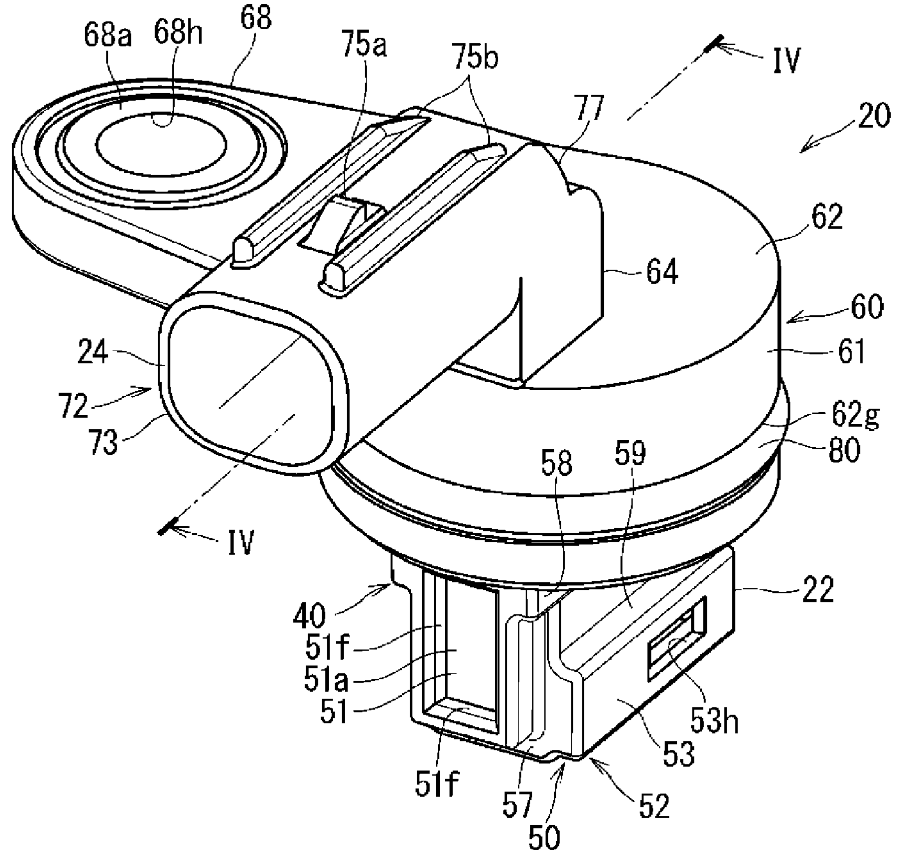
FIG. 1 is a perspective view showing a relay connector according to a first embodiment.

First, embodiments of the present disclosure are listed and described.

The connector of the present disclosure is as follows.

(1) The connector of the present disclosure is provided with a terminal including a bent part, a first resin portion for holding a part of the terminal with the bent part exposed to outside, a second resin portion molded with the first resin portion as an insert part, and a reinforcing portion arranged in an inner corner part of the bent part with an outer corner part of the bent part exposed, the bent part and the reinforcing portion being covered by the second resin portion.

According to the present disclosure, in molding the second resin portion with the first resin portion as the insert part, the deformation of the bent part is suppressed by arranging the reinforcing portion in the inner corner part of the bent part. Further, the inner corner part of the bent part can be covered by the reinforcing portion and the outer corner part of the bent part can be covered by the second resin portion. Thus, the bent part is hardly deformed due to the resin shrinkage of the second resin portion or the like. In this way, the accuracy of the position and orientation of the terminal of the connector can be further improved.

(2) In the connector of (1), the terminal may include a first extending portion extending from the bent part toward the first resin portion and a second extending portion extending from the bent part in a direction different from that of the first extending portion, and the reinforcing portion may be formed into a shape having a surface for reducing a dimension of the reinforcing portion in a longitudinal direction of the second extending portion with distance from the bent part in a longitudinal direction of the first extending portion. In this way, the reinforcing portion can be reduced in size while the deformation of the bent part is suppressed by bringing the reinforcing portion into contact with the first and second extending portions.

(3) In the connector of (1) or (2), the reinforcing portion may be a part integrally molded to the first resin portion. In this way, the reinforcing portion can be easily molded together with the first resin portion.

(4) In the connector of (1) or (2), the reinforcing portion may be separate from the first resin portion. In this way, the processing, the deformation and the like of the bent part after the molding of the first resin portion are facilitated.

(5) In the connector of (4), the reinforcing portion may be set to such a size as to be press-fit into a part surrounded by the inner corner part of the bent part and the first resin portion. In this way, the reinforcing portion is hardly shifted in position or separated from the inner corner part of the bent part.

(6) In the connector of (4) or (5), a plurality of the terminals may be provided, and the reinforcing portion may include a protrusion to be fit into between the plurality of terminals. By fitting the protrusion into between the plurality of terminals, the reinforcing portion is stably arranged in the inner corner part of the bent part. Further, the protrusion also serves to keep an interval between the plurality of terminals constant.

(7) In the connector of any one of (4) to (6), the first resin portion may be formed with a recess, a part of the reinforcing portion being fit into the recess, and the reinforcing portion may be arranged in the inner corner part of the bent part with the part of the reinforcing portion fit in the recess. By fitting the part of the reinforcing portion into the recess of the first resin portion in this way, the reinforcing portion is stably arranged in the inner corner part of the bent part.

DETAILS OF EMBODIMENTS OF PRESENT DISCLOSURE

Specific examples of a connector of the present disclosure are described below with reference to the drawings. Note that the present disclosure is not limited to these illustrations, but is represented by claims and intended to include all changes in the scope of claims and in the meaning and scope of equivalents.

First Embodiment

Figure 2:
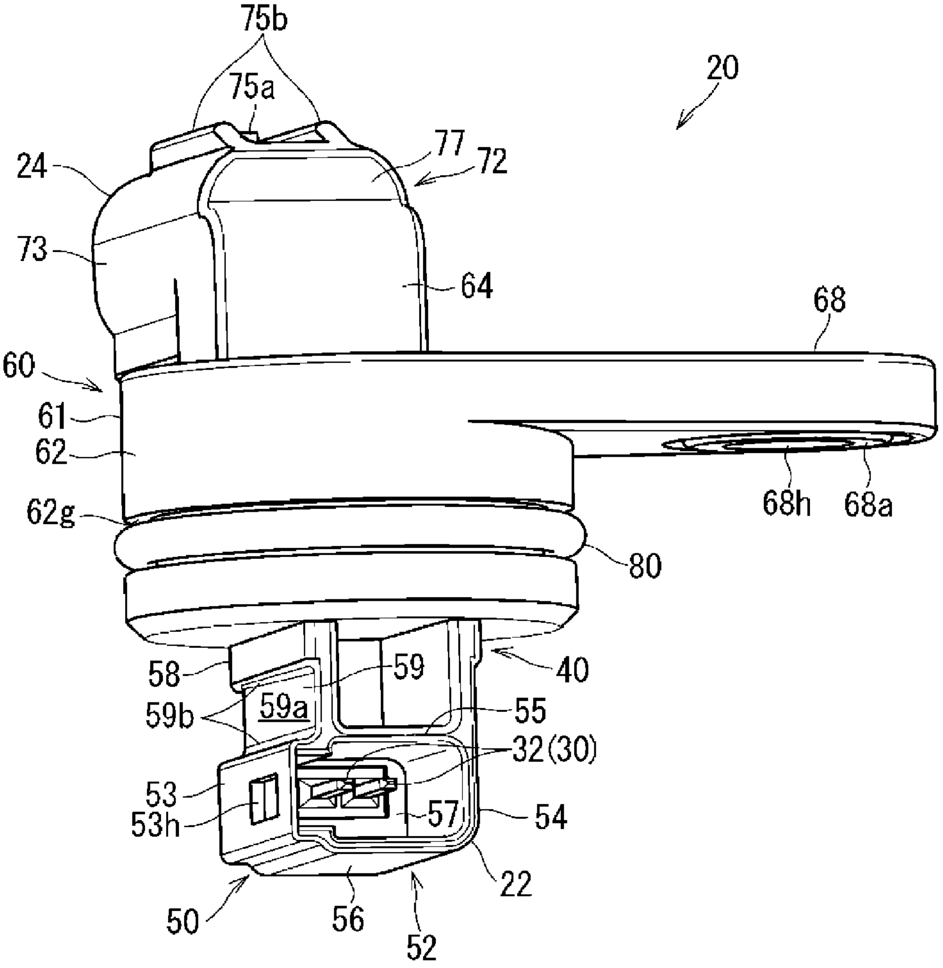
FIG. 2 is a perspective view showing the relay connector.
Figure 3:
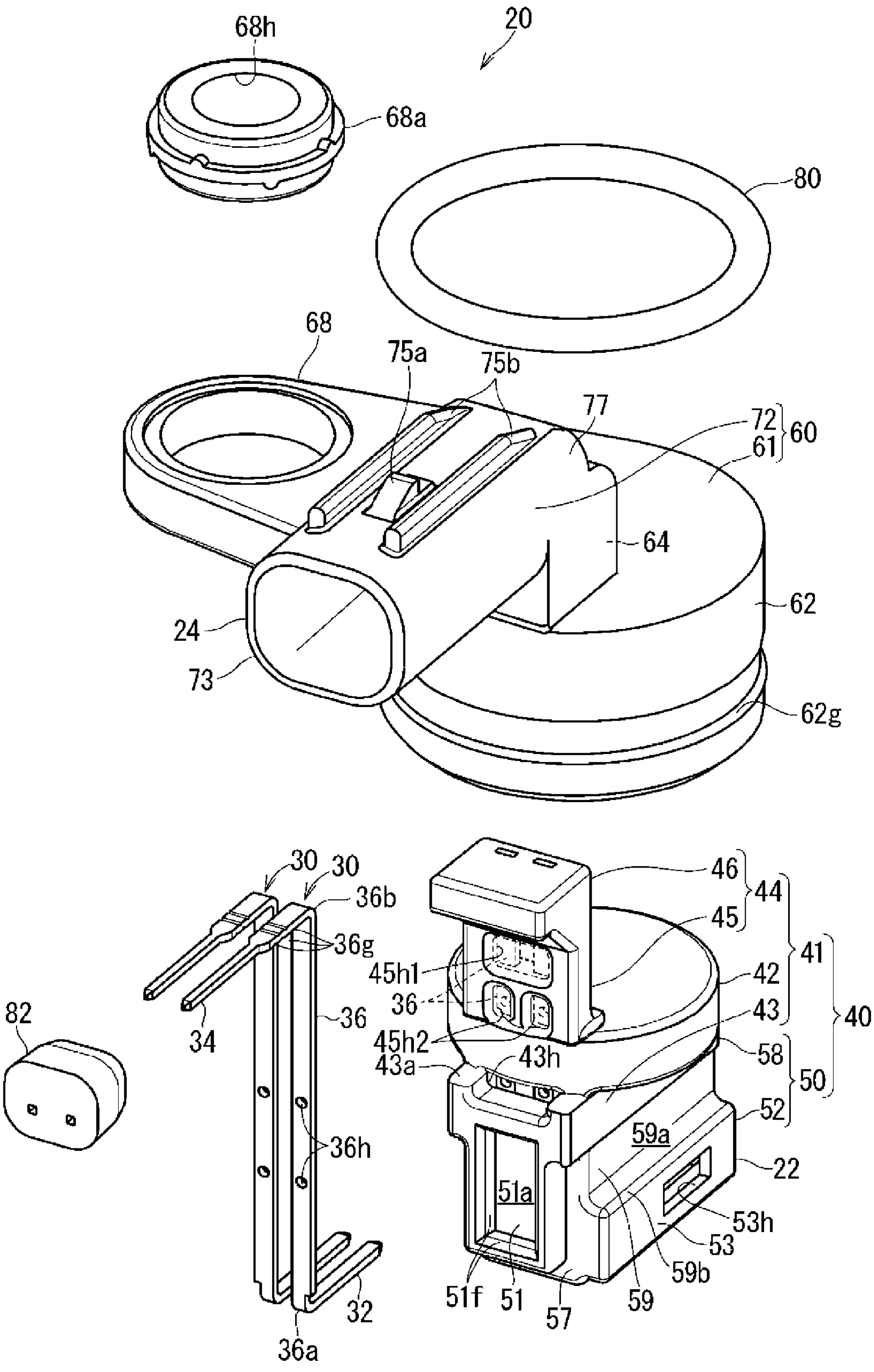
FIG. 3 is an exploded perspective view of the relay connector.
Figure 4:
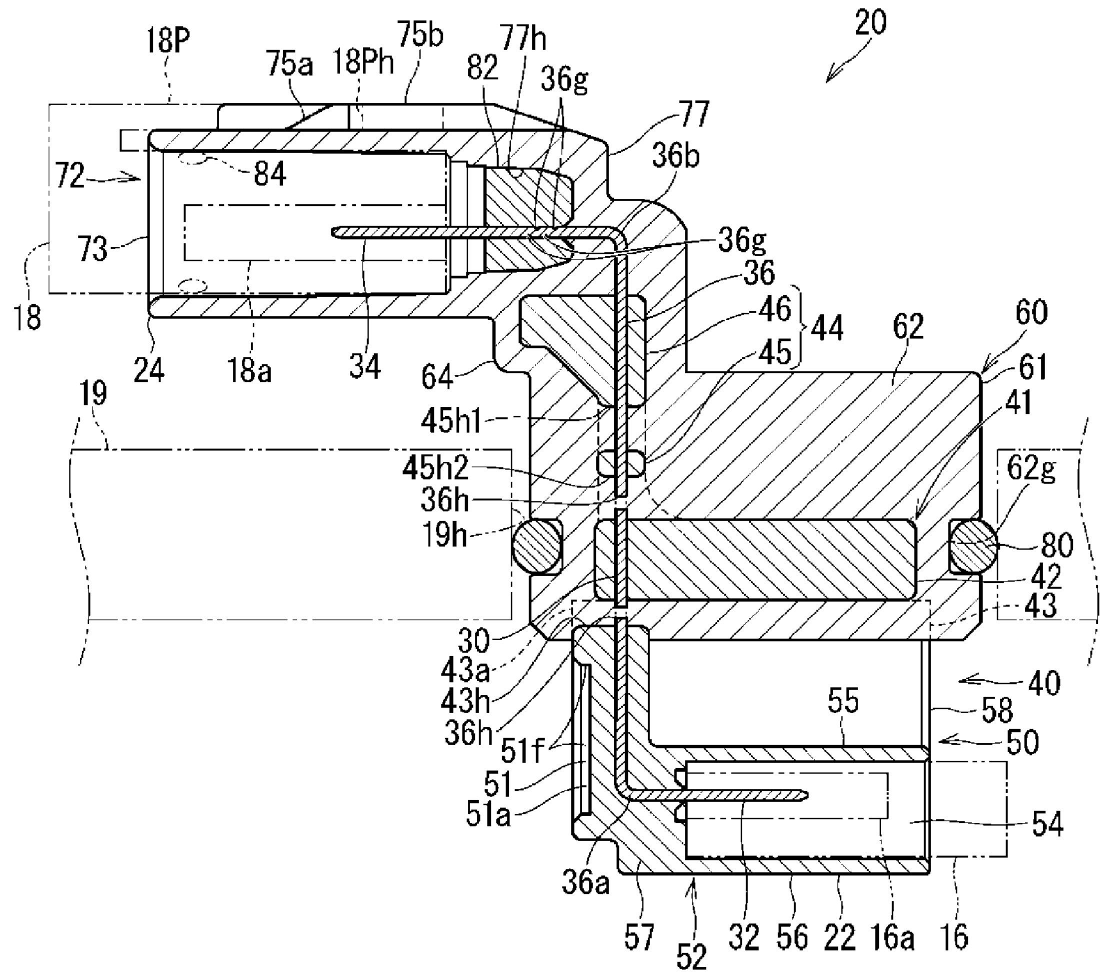
FIG. 4 is a section along IV-IV of FIG. 1.

Hereinafter, a relay connector according to a first embodiment is described. A second embodiment is described based on the first embodiment. FIGS. 1 and 2 are perspective views showing a relay connector 20. FIG. 3 is an exploded perspective view of the relay connector 20. FIG. 4 is a section along IV-IV of FIG. 1. A cross-section along IV-IV of FIG. 1 is a plane along one terminal 30. In FIG. 4, a case 19 of a device on which the relay connector 20 is to be mounted, and connectors 16, 18 to be connected to the relay connector 20 are shown by two-dot chain lines.

<Concerning Overall Configuration>

The relay connector 20 is provided with a first connector portion 22 to be connected to the connector 16 and a second connector portion 24 to be connected to the connector 18, and relays and connects the connectors 16 and 18 (see FIG. 4).

The relay connector 20 is provided with the terminals 30, a first resin portion 40 and a second resin portion 60.

The terminal 30 includes a first connector terminal portion 32, a second connector terminal portion 34 and an intermediate portion 36 (see FIG. 3). The first connector terminal portion 32 is a connector terminal for the first connector portion 22. The second connector terminal portion 34 is a connector terminal for the second connector portion 24. The intermediate portion 36 is a part connecting the first and second connector terminal portions 32, 34.

The first resin portion 40 is a part for holding the terminals 30 and includes a first resin body portion 41 and an exposed portion 50. The first resin body portion 41 is a part to be arranged in the second resin portion 60 while covering parts of the intermediate portions 36. The exposed portion 50 is a part exposed from the second resin portion 60. A bottomed tubular first connector housing portion 52 for surrounding the outer peripheries of the first connector terminal portions 32 is provided in this exposed portion 50.

The second resin portion 60 includes a second resin body portion 61 and a second connector housing portion 72. The second resin body portion 61 covers the first resin body portion 41 and the other parts of the intermediate portions 36. The second connector housing portion 72 is a bottomed tubular part for surrounding the outer peripheries of the second connector terminal portions 34.

The first and second resin portions 40, 60 may be formed of the same resin. The resin may be, for example, PBT (polybutylene terephthalate), PP (polypropylene), polyamide or the like.

In this relay connector 20, the first connector portion 22 is constituted by the first connector terminal portions 32 and the first connector housing portion 52. By connecting the connector 16 to the first connector portion 22, the first connector terminal portions 32 are inserted and connected to connector terminals 16*a* in the connector 16 (see FIG. 4). Further, the second connector portion 24 is constituted by the second connector terminal portions 34 and the second connector housing portion 72. By connecting the connector 18 to the second connector portion 24, the second connector terminal portions 34 are connected to connector terminals 18*a* of the connector 18. Further, the first and second resin body portions 41, 61 hold the first and second connector portions 22, 24 in certain postures while coupling the first and second connector portions 22, 24, and hold the terminals 30 in certain postures while covering the intermediate portions 36 of the terminals 30.

Each component of the relay connector 20 is more specifically described.

<Terminals>

In this embodiment, the relay connector 20 is provided with two terminals 30. Note that the number of the terminals provided in the relay connector 20 is arbitrary and one or more terminals may be provided. If a relay connector is provided with three or more terminals, the plurality of terminals may be arranged side by side in a row or may be arranged side by side in vertical and horizontal directions.

The terminal 30 is formed of metal such as copper or copper alloy. The terminal 30 is, for example, formed by press-working a metal plate.

The terminal 30 is formed into an elongated shape and includes the first connector terminal portion 32, the second connector terminal portion 34 and the intermediate portion 36. The first connector terminal portion 32 is an elongated plate-like or pin-like part formed in one end part of the terminal 30. The second connector terminal portion 34 is an elongated plate-like or pin-like part formed in the other end part of the terminal 30. The intermediate portion 36 is a part provided between the first and second connector terminal portions 32, 34 for electrically and mechanically connecting the first and second connector terminal portions 32, 34.

In this embodiment, the terminal 30 is formed by being bent at two positions. More specifically, a part 36*a* of the intermediate portion 36 near the first connector terminal portion 32 is bent toward one side in a thickness direction of the intermediate portion 36. Here, the bent part 36*a* is bent substantially at a right angle. Further, a part 36*b* of the intermediate portion 36 near the second connector terminal portion 34 is bent toward the other side in the thickness direction of the intermediate portion 36. Here, the bent part 36*b* is bent substantially at a right angle. That is, the both bent parts 36*a*, 36*b* of the terminal 30 are bent toward mutually opposite sides, and the first and second connector terminal portions 32, 34 are facing in mutually opposite directions. In this way, a connection direction of the connector terminal 16 to the first connector portion 22 including the first connector terminal portions 32 and a connection direction of the connector 18 to the second connector portion 24 including the second connector terminal portions 34 can be set to be opposite to each other.

The shape of an terminal is not limited to the above example. For example, an intermediate portion may be bent only at one position, i.e. the terminal may be formed into an L shape. In this case, a connection direction of a connector to a first connector portion including first connector terminal portions and a connection direction of a connector to a second connector portion including second connector terminal portions can be set to intersect, e.g. set to be orthogonal. The terminal may have a linear shape.

The first and second connector terminal portions 32, 34 are thinner than an intermediate part of the terminal 30 in a longitudinal direction. In this embodiment, a region toward a tip side of the first connector terminal portion 32 from a position closer to a center than the bent part 36*a* is formed to be thinner than the intermediate region of the terminal 30. Further, a region toward a tip side of the second connector terminal portion 34 from a position closer to the second connector terminal portion 34 than the bent part 36*b* is formed to be thinner than the intermediate region of the terminal 30. As described later, since the bent part 36*b* exposed from the first resin portion 40 is thicker than the bent part 36*a* in the first resin portion 40, the bent part 36*b* is less likely to be deformed in molding the second resin portion 60. The thickness of the terminal 30 is arbitrarily set. For example, it is not essential that the first and second connector terminal portions 32, 34 are formed to be thinner than the intermediate region of the terminal 30 and the terminal 30 may be, for example, formed to have the same width entirely in the longitudinal direction.

Further, tip parts of the first and second connector terminal portions 32, 34 are formed to be gradually thinner toward the tip sides so as to be easily inserted into the mating connector terminals.

The intermediate portion 36 is formed with through holes 36*h*. In this embodiment, a plurality of (here, two) through holes 36*h* are formed at an interval along the longitudinal direction of the intermediate portion 36 as shown in FIG. 3. The resin forming the second resin portion 60 is filled and arranged in these through holes 36*h*, whereby the terminal 30 is more reliably positioned with respect to the second resin portion 60. The through holes 36*h* may be omitted.

A part of the intermediate portion 36 near the second connector terminal portion 34 is formed with grooves 36*g* along a width direction of the terminal 30. Here, the grooves 36*g* along the width direction of the terminal 30 are formed in both surfaces of this part of the intermediate portion 36. A plurality of the grooves 36*g* are formed in each of the both surfaces of this part of the intermediate portion 36, and the plurality of grooves 36*g* are arranged in a staggered manner along the longitudinal direction of the terminal 30. The grooves 36*g* function to suppress the formation of gaps along the longitudinal direction of the terminal 30 by collecting bubbles possibly generated in filling a resin to be described later. Note that it is not essential to form the grooves 36*g*.

The plurality of terminals 30 are held in certain postures by the first and second resin portions 40, 60 while being spaced apart and adjacent. In manufacturing the relay connector 20, the first resin portion 40 is first molded with the terminals 30 as insert components. In this way, the second resin portion 60 is molded with the first resin portion 40 holding the terminals 30 as an insert component. The first resin portion 40 may be grasped as a primary resin molded portion and the second resin portion 60 may be grasped as a secondary resin molded portion. In this relay connector 20, a function of holding the terminals 30 in certain postures and a function of holding a connected state to the connectors 16, 18 can be realized by a combination of the first and second resin portions 40, 60.

By molding a resin part of the relay connector 20 separately as the first resin portion 40 and the second resin portion 60, parts of the terminals 30 exposed in a molding space can be shortened and the terminals 30 are hardly deformed and shifted in position during the molding of each resin portion.

<First Resin Portion>

The first resin portion 40 includes the first resin body portion 41 and the exposed portion 50 as described above.

More specifically, as shown in FIG. 3, the first resin body portion 41 includes a base portion 42 and a projecting portion 44. The base portion 42 is formed into a flat shape, here a disk shape. The projecting portion projects on one surface side of the base portion 42. The projecting portion 44 projects from a position of the base portion 42 deviated from a center of the base portion 42, here from an outer peripheral part. The projecting portion 44 projects in a direction intersecting, here orthogonal to, one surface of the base portion 42.

A base frame portion 43 is provided to project on the other surface side of the base portion 42. The base frame portion 43 is formed into a U shape open on one side and closed on other three sides. An intermediate frame portion 58 to be described later is connected to this base frame portion 43.

A part of the intermediate portion 36 of the terminal 30 is arranged along an extending direction of the projecting portion 44 in the projecting portion 44. A part of the intermediate portion 36 near the second connector terminal portion 34 extends outward from the projecting portion 44. The bent part 36*b* is located outside the projecting portion 44. The second connector terminal portion 34 is bent at the bent part 36*b* and extends along a direction intersecting (here, orthogonal to) the projecting portion 44. A part of the intermediate portion 36 near the first connector terminal portion 32 is passed through the base portion 42 from the projecting portion 44 and extends toward the exposed portion 50 through a bottom portion 43*a* of the base frame portion 43. The intermediate portion 36 is bent toward a side opposite to the second connector terminal portion 34 at the bent part 36*a* in the exposed portion 50, and the first connector terminal portion 32 extends toward a side opposite to the second connector terminal portion 34.

The exposed portion 50 includes the intermediate frame portion 58 and the first connector housing portion 52.

The intermediate frame portion 58 is formed into a U shape closed on the other three sides. The intermediate frame portion 58 is connected to the base frame portion 43. In this way, a rectangular space is formed which is surrounded by the other surface of the base portion 42, a surface of the first connector housing portion 52 facing toward the base portion 42 and two inward facing surfaces and an inward facing bottom surface of each of the base frame portion 43 and the intermediate frame portion 58 (see FIG.

4). This space is open toward the same side as the opening of the first connector housing portion 52.

The first connector housing portion 52 is formed into a bottomed tubular shape to surround the outer peripheries of the first connector terminal portions 32. Here, the first connector housing portion 52 is formed into a bottomed rectangular tubular shape open on one side. The first connector housing portion 52 may be formed into another bottomed tubular shape such as an elliptical cylindrical shape or a cylindrical shape.

As shown in FIGS. 2 and 3, the first connector housing portion 52 includes four peripheral wall portions 53, 54, 55 and 56 and a bottom portion 57. The intermediate frame portion 58 is formed to extend toward the peripheral wall portion 55 from two facing peripheral wall portions 53, 54 and the bottom portion 57. The base frame portion 43 is connected on an extension of this intermediate frame portion 58. In this way, one side part of the first connector housing portion 52 is connected to the base frame portion 43 in the first resin body portion 41 via the intermediate frame portion 58. Note that the peripheral wall portion 53 on one side in the first connector housing portion 52 is formed with a locking hole **53*h*, into which a locking projection of the mating connector 18** is locked.

In this state, an axial direction of the first connector housing portion 52 and an extending direction of the intermediate portion 36 in the first resin portion 41 are intersecting (here, orthogonal). Thus, the first resin body portion 41 is connected to the exposed portion 50 in the direction intersecting (here, orthogonal to) the axial direction of the first connector housing portion 52. The orientation of the first connector housing portion 52 may be set according to that of the first connector terminal portion 32 with respect to the intermediate portion 36.

The intermediate portion 36 of the terminal 30 reaches the bottom portion 57 of the first connector housing portion 52 through a bottom part of the intermediate frame portion 58. The intermediate portion 36 is bent at the bent part **36*a* in the bottom portion 57. In this way, the first connector terminal portion 32 comes out from the bottom portion 57 and extends along the axial direction of the first connector housing portion 52 in the first connector housing portion 52**.

Some components of the first resin portion 40 are more specifically described.

The projecting portion 44 includes a thin portion 45 and a thick portion 46. The thin portion 45 is a part of the projecting portion 44 on the side of the base portion 42.

The thin portion 45 is formed into a rectangular parallelepiped shape in which a dimension in an arrangement direction of the two terminals 30 (also a tangential direction at a part provided with the terminals 30 on the outer peripheral edge of the base portion 42) is longer than a dimension in a direction (radial direction of the base portion 42) orthogonal to the arrangement direction of the terminals 30 and an extending direction of the terminals 30. A part of the thin portion 45 protrudes outward from the outer peripheral edge of the base portion 42, but this is not essential.

The thick portion 46 is provided closer to the second connector portion 24 than the thin portion 45. The thick portion 46 is formed to be thicker than the thin portion 45. In this embodiment, the thick portion 46 is formed to more largely project from the thin portion 45 in a part around the intermediate portions 36 than in other parts. Here, the thick portion 46 more largely projects in a direction from the bent parts **36*b* toward the second connector terminal portions 34 than in the other parts around the intermediate portions 36**.

More specifically, the thick portion 46 includes a rectangular parallelepiped part. The rectangular parallelepiped part projects in a direction toward the tip parts of the second connector terminal portions 34 with respect to the thin portion 45, and is flush with the thin portion 45 in other three directions. Out of the rectangular parallelepiped part, a part projecting with respect to the thin portion 45 is connected to the thin portion 45 via a slope. Out of the thick portion 46, a part opposite to the thin portion 45 is formed into a flat surface orthogonal to an extending direction of the thin portion 45 and the intermediate portions 36 of the terminals 30 extend from this part.

The thin portion 45 is formed with window portions **45*h*1, 45*h*2 for exposing the intermediate portions 36 to the outside of the first resin portion 40. The window portion 45*h*1 is formed in a part of the thin portion 45 near the thick portion 46. In the window portion 45*h*1, parts of the two intermediate portions 36 are commonly exposed. The window portions 45*h*2 are formed to correspond to the two intermediate portions 36. In each window portion 45*h*2, a part of the intermediate portion 36 is exposed. A part of the intermediate portion 36 exposed in the window portion 45*h*1 is formed with one through hole 36*h*. The second resin portion 60 is filled in the window portions 45*h*1, 45*h*2 and the through holes 36*h***.

Window portions **43*h* are formed in the bottom portion 43*a* of the base frame portion 43 on a side opposite to an opening. Two window portions 43*h* are formed to correspond to the two intermediate portions 36. In each window portion 43*h*, a part of the intermediate portion 36 is exposed. The part of the intermediate portion 36 exposed in the window portion 43*h* is formed with one through hole 36*h*. The second resin portion 60 is filled into the window portions 43*h* and the through hole 36*h***.

It is not essential to form the window portions **45*h*1, 45*h*2 and 43*h***.

A part of the exposed portion 50 on a side opposite to the opening of the first connector housing portion 52 is formed with a positioning recess 51. The positioning recess 51 is a recess open toward a side opposite to the opening of the first connector housing portion 52. The positioning recess 51 is, for example, a recess defined by a bottom surface **51*a* facing toward the side opposite to the opening of the first connector housing portion 52 and four side surfaces 51*f*. The four side surfaces 51*f* may include parts orthogonal to the bottom surface 51*a*. The side surfaces 51*f* may be arranged at positions corresponding to respective sides of a rectangular shape (including a square shape). Note that an opening edge part of the positioning recess 51** is formed into an inclined surface inclined outward, but this is not essential.

In molding the second resin portion 60, positioning surfaces of a mold can be brought into contact with the bottom surface **51*a* and the four side surfaces 51*f* of the positioning recess 51. In this way, the exposed portion 50 is positioned with respect to the mold in a total of five facing directions of the bottom surface 51*a* and the four side surfaces 51*f***.

In this embodiment, the positioning recess 51 is formed from an outward facing part of the bottom portion 57 of the first connector housing portion 52 to an outward facing part of a bottom portion of the intermediate frame portion 58. The positioning recess may be formed only in the bottom portion 57 of the first connector housing portion 52 or may be formed only in the outward facing part of the bottom portion of the intermediate frame portion 58.

A positioning groove 59 extending from the opening of the first connector housing portion 52 toward the bottom portion 57 is formed in the outward facing part of the exposed portion 50. The positioning groove 59 is, for example, a groove defined by an outward facing bottom surface 59*a* and side surfaces 59*b*, 59*b* on both sides of the bottom surface 59*a* (see FIG. 2).

More specifically, a part near the base frame portion 43, out of the outward facing part on one side of the intermediate portion 58, is thickly formed to project outward. The peripheral wall portion 53 on one side of the first connector housing portion 52 is formed at a position outward of the one side of the intermediate frame portion 58. The positioning groove 59 is formed between the thickly formed part of the exposed portion 50 and the peripheral wall portion 53 on the one side of the first connector housing portion 52. The positioning groove 59 may be formed in another part of the exposed portion 50, e.g. in the outer periphery of the first connector housing portion 52.

In molding the second resin portion 60, positioning surfaces of the mold can be brought into contact with the bottom surface 59*a* and the both side surfaces 59*b* of the positioning groove 59. In this way, the first resin portion 40 is positioned with respect to the mold in three facing directions of the bottom surface 59*a* and the two side surfaces 59*b* in the part formed with the positioning groove 59.

Note that, in this embodiment, a part near the base frame portion 43, out of the outward facing part on the other side of the intermediate frame portion 58, is also thickly formed to project outward.

<Second Resin Portion>

As described above, the second resin portion 60 includes the second resin body portion 61 and the second connector housing portion 72.

As shown in FIGS. 1, 3 and 4, the second resin body portion 61 includes a base portion 62 and a projecting portion 64. The base portion 62 is formed into a flat shape, here a disk shape. This base portion 62 covers the outer periphery and both surfaces of the base portion 42 of the first resin body portion 41. The projecting portion 64 projects on one surface side of the base portion 62. The projecting portion 64 projects from a position of the base portion 62 deviated from a center of the base portion 62. The projecting portion 64 covers the projecting portion 44 of the first resin body portion 41. The projecting portion 64 also covers a tip part of the projecting portion 44. Thus, the second resin body portion 61, more specifically the projecting portion 64, covers parts of the intermediate portions 36 of the terminals 30 between the projecting portion 44 and the bent parts 36*b* on an extension of the projecting portion 44. That is, the second resin body portion 61 covers at least parts of the intermediate portions 36 closer to the first connector terminal portions 32 than the bent parts 36*b*. A part of the second resin body portion 60 covering the thick portion 46 projects further than the base portion 62 in the extending direction of the second connector terminal portions 34.

Note that the base portion 62 is provided with the following configuration for mounting the relay connector 20 on the case 19. That is, a peripheral groove 62*g* is formed in a part near the first connector housing portion 52, out of an outer peripheral part of the base portion 62. An annular sealing member 80 is fit into the peripheral groove 62*g*. The annular sealing member 80 is, for example, a rubber ring. With the relay connector 20 mounted on the case 19 of a mounting target device (e.g. transmission), a part of the base portion 62 on the side of the first connector housing portion 52 is fit into a mounting hole 19*h* of the case 19 (see FIG. 4). In this state, the annular sealing member 80 is interposed in a compressed state between the second resin body portion 61 and the inner peripheral surface of the mounting hole 19*h* to restrict the passage of liquid between the mounting hole 19*h* and the relay connector 20. Note that, depending on the use application of the relay connector 20, the annular sealing member 80 may be omitted.

Further, a screwed portion 68 projects in a part of the outer peripheral part of the second resin body portion 61. The screwed portion 68 is formed into a flat shape in a direction connecting the first and second connector housing portions 52, 72. The screwed portion 68 is formed with a screw insertion hole 68*h*. A metal annular member 68*a* (called also a metal collar) may be provided in a part of the screwed portion 68 where the screw insertion hole 68*h* is formed. By threadably engaging a screw with a screw hole on the side of the case 19 through this screw insertion hole 68*h*, the relay connector 20 is screwed and fixed to this case. Note that the relay connector 20 needs not be fixed by screwing and may be fixed by another fit-in structure or the like.

The second connector housing portion 72 is formed into a bottomed tubular shape to surround the outer peripheries of the second connector terminal portions 34. Here, the second connector housing portion 72 is formed into a bottomed rectangular tubular shape open on one side and having each corner part rounded. The second connector housing portion 72 may be formed into another bottomed tubular shape such as an elliptical cylindrical shape or a cylindrical shape.

The second connector housing portion 72 includes a peripheral wall portion 73 and a bottom portion 77. The peripheral wall portion 73 has a tubular shape, here a rectangular tube shape with rounded corners. A part of the bottom portion 77 of the second connector housing portion 72 and a part near the bottom portion 77, out of the peripheral wall portion 73 on the side of the projecting portion 64, are connected to the projecting portion 64 of the second resin body portion 61. That is, the second connector housing portion 72 is supported in a cantilever manner by the projecting portion 64. In this state, an axial direction of the second connector housing portion 72 and the extending direction of the intermediate portions 36 in the second resin body portion 61 are intersecting (here, orthogonal). Note that the orientation of the second connector housing portion 72 may be set according to those of the second connector terminal portions 34 with respect to the intermediate portions 36.

A sealing recess 77*h* is formed in an inward facing part of the bottom portion 77, in which the second connector terminal portions 34 extend, out of the second connector housing portion 72 (see FIG. 4). Parts of the intermediate portions 36 formed with the grooves 36*g* are provided in the sealing recess 77*h*. A terminal sealing member 82 is provided in the sealing recess 77*h*. The terminal sealing member 82 is formed by filling and arranging a potting material such as polyurethane into the sealing recess 77*h* and solidifying the potting material. The terminal sealing member 82 may be made of thermoplastic resin, which is softened by heat.

Note that a locking protrusion 75*a* and a pair of guide protrusions 75*b* are formed on a part of the outer peripheral part of the second connector housing portion 72, here on a part of the peripheral wall portion 73 on a side opposite to the first connector housing portion 52. The locking protrusion 75*a* is formed to gradually become lower toward an opening side of the second connector housing portion 72. The pair of guide protrusions 75*b* are protrusions extending along an axial direction of the second connector housing portion 72 and provided at an interval on both sides of the locking protrusion 75*a*. If the mating connector 18 is connected to the second connector portion 24, a lock piece 18P provided on the connector 18 is fit into between the pair of guide protrusions 75*b* along the outer surface of the peripheral wall portion 73 and the locking protrusion 75*a* is locked into a locking hole 18Pn formed in the lock piece 18P.

<Mounted State on Case>

With the relay connector 20 mounted on the case 19, the base portion 62 is fit in the mounting hole 19*h* and the screwed portion 68 is fixed to the case 19 by screwing as described above (see FIG. 4).

The case 19 is, for example, a case of a device including a movable mechanism such as a motor or gear. The first connector portion 22 is exposed in the case 19 and the second connector portion 24 is exposed outside the case 19. The connector 16 on an end of wiring pulled out from a small-current signal device (e.g. sensor) in the case is, for example, connected to the first connector portion 22. The connector 18 on an end of a wiring harness outside the device is, for example, connected to the second connector portion 24. In this way, the relay connector 20 relays and connects the wiring harness outside the device and the wiring in the device. In this case, the relay connector 20 is a relay connector for relaying signals. The terminals 30 for relaying signals are thinner than power supply terminals in many cases. In such cases, it is more required to suppress the deformation of the terminals.

In the relay connector 20, the annular sealing member 80 and the terminal sealing member 82 for suppressing liquid intrusion are provided on/in the second resin portion 60. Since the second resin portion 60 is molded with the first resin portion 40 as an insert part, the surface of the second resin portion 60 can be expected to be smoother than the surface of the first resin portion 40. Since such a second resin portion 60 is provided with the annular sealing member 80 and the terminal sealing member 82, liquid intrusion between the second resin portion 60 and the annular sealing member 80, the terminal sealing member 82 can be effectively suppressed.

Particularly, the second connector housing portion 72, which is a part of the second resin portion 60, is exposed outside the case 19. Thus, the second connector housing portion 72 outside the case 19 is more easily wetted with water than the first connector housing portion 52 in the case 19. By forming this second connector housing portion 72 by the second resin portion 60, the surface shape of the second connector housing portion 72 can be made smooth. By providing the terminal sealing member 82 in the second connector housing portion 72, water can be suppressed from reaching the terminals 30 along the terminal sealing member 82 and the inner surface of the sealing recess 77*h* and waterproofness for the terminals 30 is further improved.

Note that an annular sealing member 84 may be provided between the connector 18 and the second connector housing portion 72 (see FIG. 4). The annular sealing member 84 may be mounted on the connector 18. This annular sealing member 84 is also pressed against the inner peripheral surface of the second connector housing portion 72, which is a part of the second resin portion 60. Since this inner peripheral surface is expected to be finished into a smooth surface as described above, waterproofness by this annular sealing member 84 is also improved.

<Relay Connector Manufacturing Example by Mold>

A manufacturing example of molding the second resin portion 60 of the relay connector 20 is described.

Figure 5:
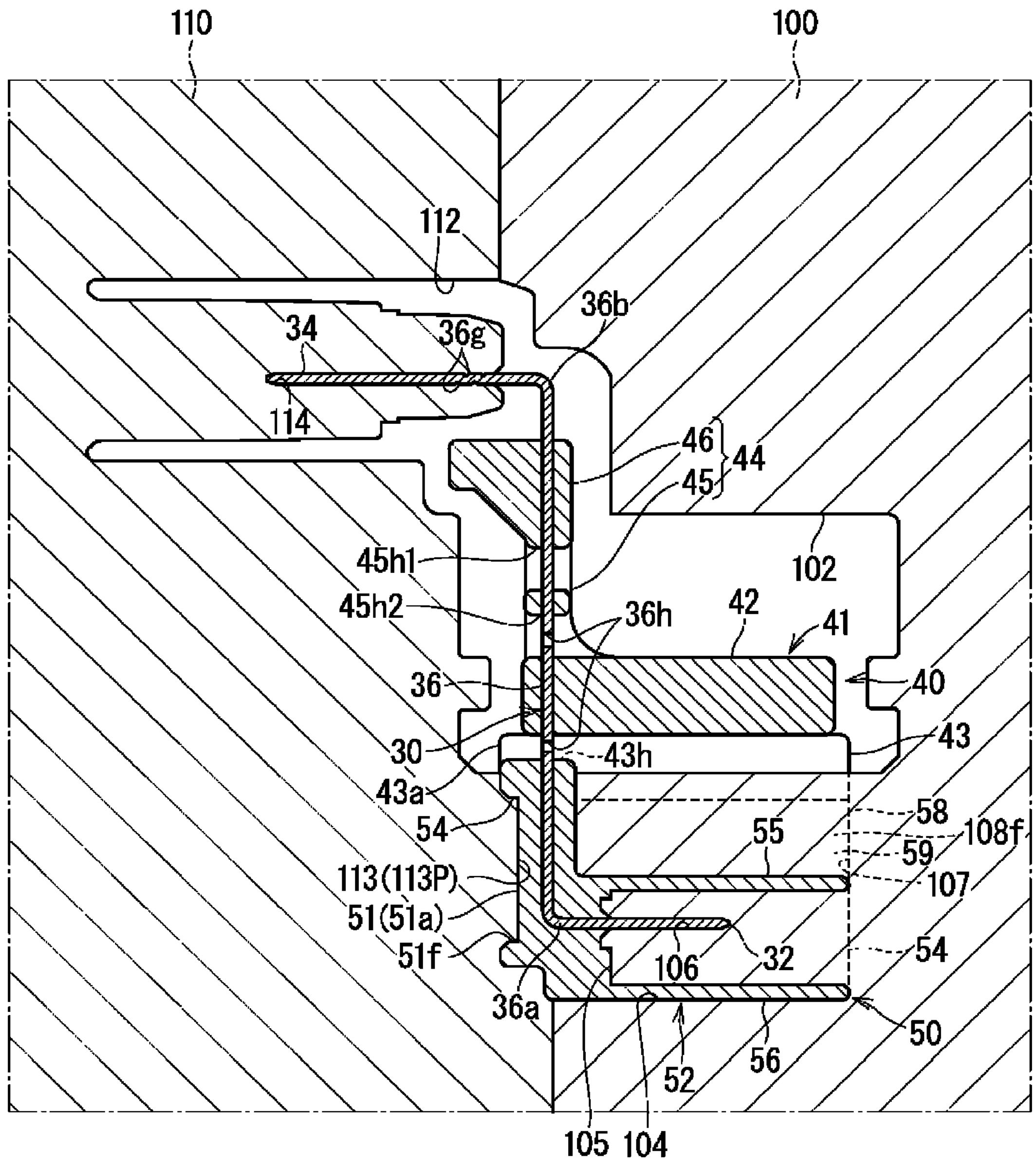
FIG. 5 is a diagram showing a state where terminals and a first resin portion are arranged in a mold.

FIG. 5 shows an example showing a state where the first resin portion 40 molded with the terminals 30 as insert parts is arranged in molds 100, 110 for molding the second resin portion 60. The first and second molds 100, 110 are shown as examples. The first mold 100 has a mold surface 102 for forming a surface of the second resin portion 60 observable from the opening side of the first connector housing portion 52. The second mold 110 has a mold surface 112 for forming a surface of the second resin portion 60 observable from the opening side of the second connector housing portion 72. By uniting the first and second molds 100, 110, a molding space for forming the second resin portion 60 is formed. If a surface is present which is not suitably formed by the first and second molds 100, 110, another mold such as a slide mold is combined as appropriate.

The first mold 100 is formed with a positioning annular groove 104 for positioning the first connector housing portion 52. The positioning annular groove 104 is formed into such an annular shape that the peripheral wall portions 53, 54, 55 and 56 are fittable thereinto. More specifically, the inner side surface of the positioning annular groove 104 is formed into a shape (same surface shape or (slightly) smaller similar shape) corresponding to the inner peripheral surface shape of the first connector housing portion 52. The outer side surface of the positioning annular groove 104 is formed into a shape (same surface shape or (slightly) larger similar shape) corresponding to the inner peripheral surface shape of the first connector housing portion 52.

With the first connector housing portion 52 fit in the positioning annular groove 104, the outward facing surfaces of the peripheral wall portions 53, 54, 55 and 56 of the first connector housing portion 52 are in contact with the outer surface of the positioning annular groove 104. Further, the inward facing surfaces of the peripheral wall portions 53, 54, 55 and 56 of the first connector housing portion 52 are in contact with the inner surface of the positioning annular groove 104. In this way, the first connector housing portion 52 is positioned in two axial directions orthogonal to the axis of the first connector housing portion 52 and orthogonal to each other. Further, an inner part 105 of the positioning annular groove 104, out of the first mold 100, is in contact with the inward facing surface of the bottom portion 77. In this way, the first connector housing portion 52 is also positioned in a direction toward the opening side thereof.

The inner part 105 is formed with first terminal positioning holes 106, into which the first connecter terminal portions 32 are inserted. By inserting the first connecter terminal portions 32 into the first terminal positioning holes 106, the terminals 30 are positioned.

Note that the first mold 100 is formed with a groove 107, into which both side parts of the intermediate frame portion 58 are fittable. By fitting the both side parts of the intermediate frame portion 58 into the groove 107, the inner surfaces of the both side parts and the bottom portion of the intermediate frame portion 58 are positioned.

Further, out of the first mold 100, the outer side surface of the positioning annular groove 104 and the outer side surface of the groove 107 are formed with a positioning surface 108*f*, which can be held in surface contact with the positioning groove 59 described above. Since the positioning groove 59 is a groove extending from the opening of the first connector housing portion 52 toward the bottom portion 77, the positioning surface 108*f* can also be easily arranged in the positioning groove 59 in fitting the exposed portion 50 into the positioning annular groove 104 and the groove 107.

The second mold 110 is formed with a bottom portion positioning surface 113 for positioning the outward facing surfaces of the bottom portion 77 of the first connector housing portion 52 and the bottom portion of the intermediate frame portion 58. The bottom portion positioning surface 113 includes a surface formed by a positioning protrusion 113P, which can be arranged in the positioning recess 51. The positioning protrusion 113P has a protrusion shape arrangeable in the positioning recess 51, and the surface thereof is formed to be able to come into surface contact with the bottom surface 51*a* and the side surfaces 51*f* of the positioning recess 51. Thus, the bottom portion positioning surface 113 comes into surface contact with the exposed portion 50 from a side opposite to the first mold 100, whereby the bottom portion 77 of the first connector housing portion 52 and the bottom portion of the intermediate frame portion 58 are positioned in the facing directions of the respective bottom surface 51*a* and side surfaces 51*f*.

Further, second terminal positioning holes 114, into which the second connecter terminal portions 34 are insertable, are formed inside a part for forming the second connector housing portion 72, out of the second mold 110. By inserting the second connecter terminal portions 34 into the second terminal positioning holes 114, the terminals 30 are positioned.

With the exposed portion 50 of the first resin portion 40 supported by the first and second molds 100, 110, the first resin body portion 41 is arranged at a position separated from the mold surfaces 102, 112. The intermediate portions 36 of the terminals 30 extend out from the projecting portion 44, pass through a molding space, are bent at the bent parts 36*b* and extend toward the second terminal positioning holes 114.

Figure 6:
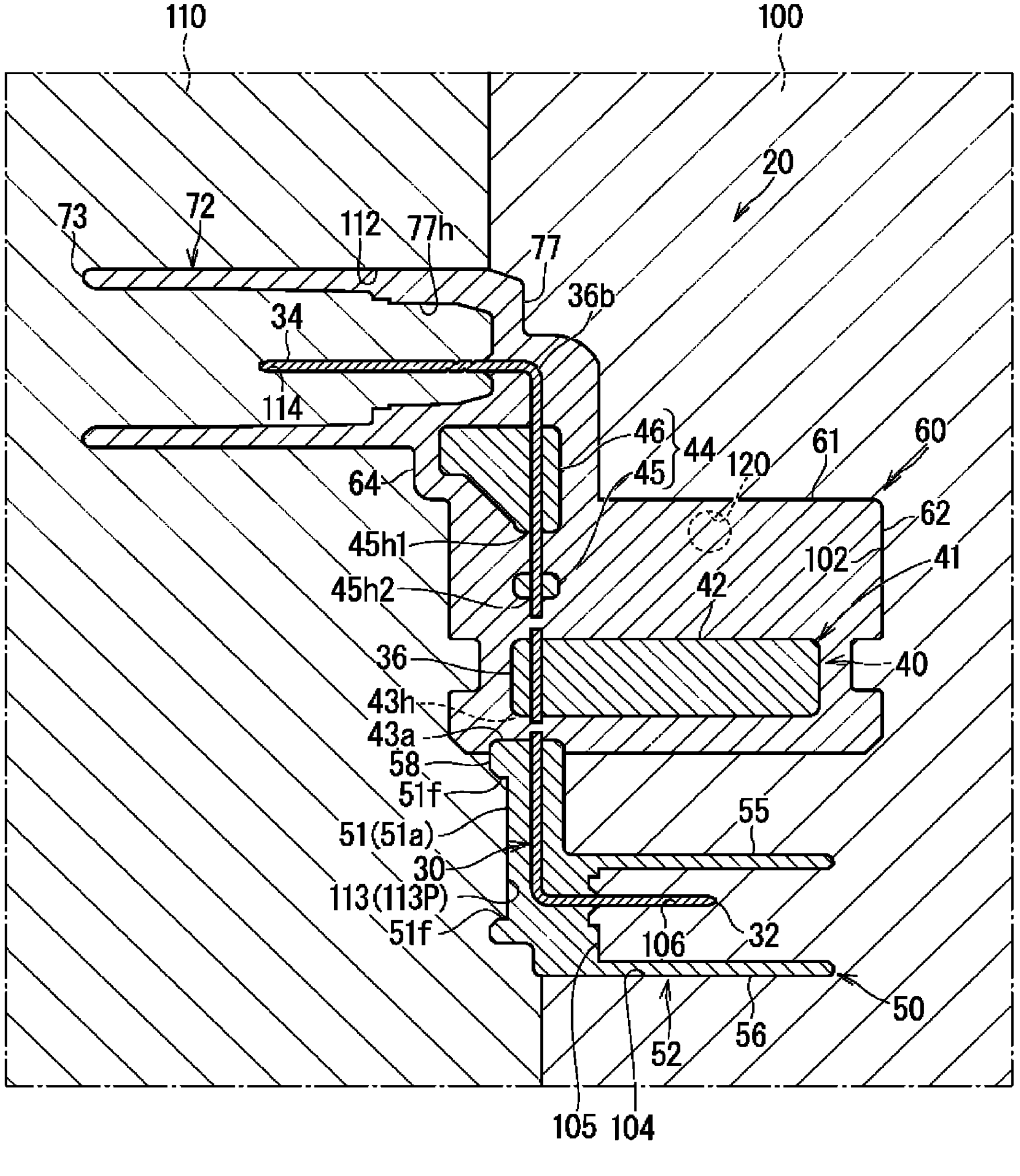
FIG. 6 is a diagram showing a process of molding a second resin portion.

In this state, a molten resin is injected into the molding space as shown in FIG. 6. An injection port 120 is, for example, formed to face a part for forming the base portion 62. The molten resin flows into a space for forming the second resin portion 60 through between the first resin portion 40, the intermediate portions 36 and the mold surfaces 102, 112. By cooling and solidifying the molten resin, the second resin portion 60 is molded.

<Effects, Etc>

According to the relay connector 20 configured as just described, parts of the terminals 30 can be held by the first resin body portion 41 in the molding space in the molds 100, 110 in molding the second resin portion 60. Thus, parts of the terminals 30 supported to extend in the molds 100, 110 can be shortened, and the deformation of the terminals 30 by a resin pressure or the like is suppressed. Further, in molding the second resin portion 60, the first resin portion 40 can be positioned using the first connector housing portion 52. Since the first connector housing portion 52 has a bottomed tubular shape surrounding the first connecter terminal portions 32, the first resin portion 40 can be positioned in many directions using the peripheral wall portions 53, 54, 55 and 56 and the bottom portion 57 of this bottomed tubular part. Thus, the first resin portion 40 holding the terminals 30 can be more reliably positioned. In this way, the deformation of the terminals 30 in the relay connector 20 is suppressed and an aligned state of the plurality of terminals 30 is satisfactorily maintained as designed.

Further, the first resin body portion 41 is connected to the exposed portion 50 in a direction intersecting the axial direction of the first connector housing portion 52. Thus, the outward facing surface of the bottom portion 57 of the first connector housing portion 52 is exposed to outside. In this way, the first resin portion 40 can be positioned in three axial directions orthogonal to each other and the first resin portion 40 can be more reliably positioned, using the inner and outer surfaces of the bottom portion 57 of the first connector housing portion 52.

Further, since the positioning recess 51 is formed in the part of the exposed portion 50 on the side opposite to the first connector housing portion 52, the first resin portion 40 can be more reliably positioned, also using this positioning recess 51.

Further, the positioning groove 59 extending from the opening of the first connector housing portion 52 toward the bottom portion 57 is formed in the outward facing part of the exposed portion 50. Thus, the first resin portion 40 can be more reliably positioned, using the inner surface of the positioning groove 59.

Further, the projecting portion 44 of the first resin body portion 41 includes the thin portion 45 and the thick portion 46. The intermediate portions 36 extend from the thick portion 46 of the projecting portion 44, and these parts are directly covered by the second resin portion 60. Thus, a part of the second resin portion 60 near the second connector terminal portions 34 may not cover the first resin body portion 41. In this way, a part of the relay connector 20 near the second connector housing portion 72 can be reduced in size. For example, a part of the second resin body portion 61 on an opposite side in an extending direction of the second connector housing portion 72 can be reduced in size. Further, in molding the second resin portion 60, a force for deforming the terminals 30 by a resin pressure easily acts on the thick portion 46, which is a tip part of the projecting portion 44. However, this force is received by the thick portion 46. Thus, the deformation of the terminals 30 is more effectively suppressed.

Further, the thick portion 46 is thicker in a part than in other parts around the thin portion 45. Thus, the shape of the relay connector 20 is easily adjusted according to an external environment of the relay connector 20. Here, the external environment is an environment outside the relay connector 20, e.g. an environment influential to the structure of the relay connector 20 such as a positional relationship of the device arranged around the relay connector 20 and the relay connector 20.

Here, the thick portion 46 more largely projects in the direction toward the second connector terminal portions 34 than in the other parts around the intermediate portions 36. Thus, a part of the second resin body portion 61 extending toward the second connector housing portion 72 is set to project further outward than the base portion 62, so that a thickness of the resin covering the thick portion 46 can be obtained. In contrast, since the thick portion 46 does not project with respect to the thin portion 45 on a side of the second resin body portion 61 toward a center of the base portion 72 from the intermediate portions 36, a part for covering the thick portion 46 needs not be formed to largely project toward a central side of the base portion 62. In this way, the other surface of the base portion 62 on the side where the second connector housing portion 72 is provided can keep a planar shape in many parts. In this way, such as when another component is present above the relay connector 20, for example, with the relay connector 20 mounted on the case 19, the interference of the relay connector 20 and the other component can be effectively suppressed.

Further, the first resin portion 40 is exposed to a high-temperature environment in the mold again when the second resin portion 60 is molded, whereas the second resin portion 60 is hardly exposed to such an environment. Thus, the surface of the second resin portion 60 is expected to be more smoothly formed than the surface of the first resin portion

40. Accordingly, by providing the annular sealing members 80, 84, the terminal sealing member 82 and the like on/in the second resin portion 60, sealability by these sealing members is expected to be improved.

Second Embodiment

Figure 7:
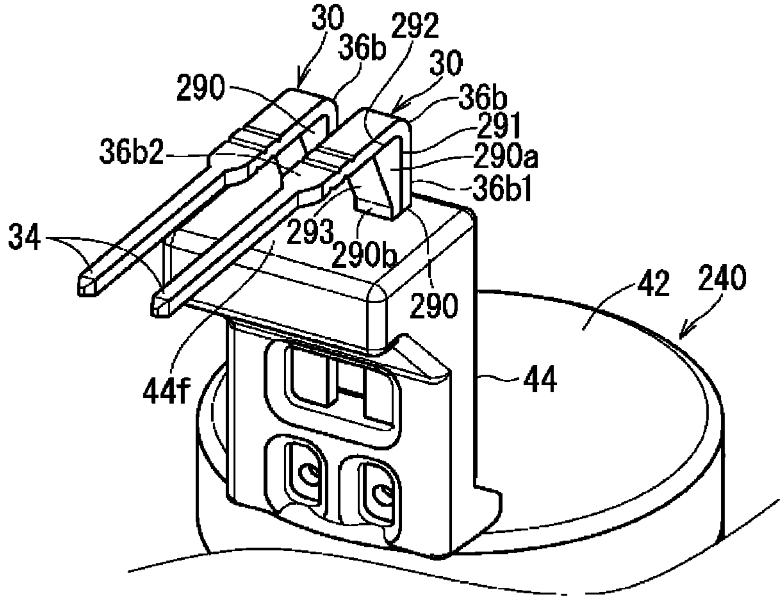
FIG. 7 is a perspective view showing reinforcing portions, terminals and a first resin portion according to a second embodiment.
Figure 8:
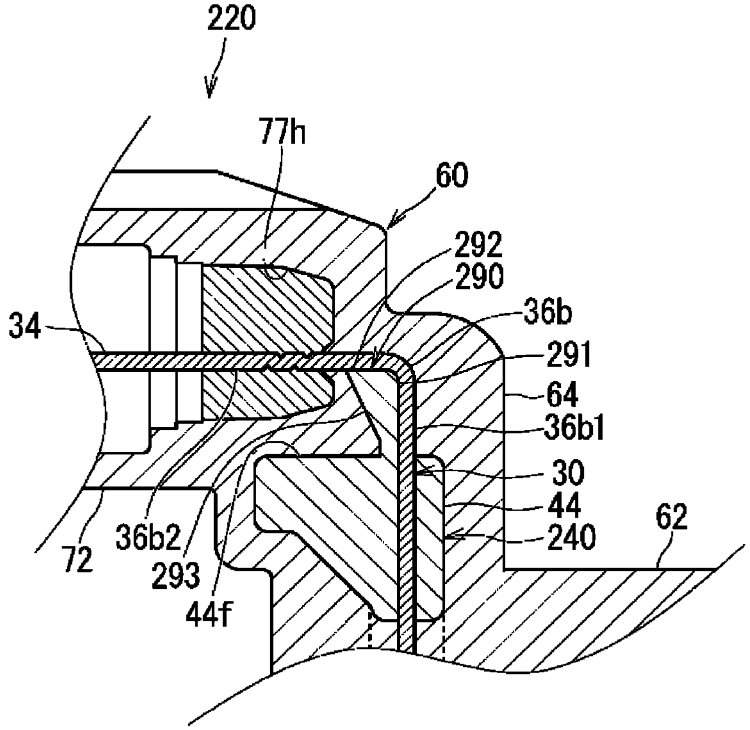
FIG. 8 is a partial section of a relay connector.

A connector according to a second embodiment is described. The second embodiment is described based on the relay connector according to the first embodiment. In the description of the second embodiment, constituent elements similar to those described in the first embodiment are denoted by the same reference signs and not described. FIG. 7 is a perspective view showing terminals, 30, a first resin portion 240 and reinforcing portions 290. FIG. 8 is a partial section of a relay connector 220. FIG. 8 is a section along the same plane as in FIG. 4.

The relay connector 220 is provided with the terminals 30, the first resin portion 240, a second resin portion 60 and the reinforcing portions 290. The terminals 30 and the second resin portion 60 are the same as those described in the first embodiment. The first resin portion 240 is configured similarly to the first resin portion 40 described in the first embodiment except in being integrally formed with the reinforcing portions 290. The relay connector 220 can be grasped as the one obtained by adding the reinforcing portions 290 to the relay connector 20 in the first embodiment.

The terminal 30 includes a bent part **36*b*. A part extending from the bent part 36*b* toward the first resin portion 240 is a first extending portion 36*b*1. A part extending from the bent part 36*b* in a direction different from that of the first extending portion 36*b*1, i.e. in a direction toward a second connector terminal portion 34, is a second extending portion 36*b*2**.

The first resin portion 240 holds parts of the terminals 30 with the bent parts **36*b* exposed to outside from the first resin portion 240. More specifically, a part of the first extending portion 36*b*1 distant from the bent part 36*b* is covered by a projecting portion 44 of the first resin portion 240. The first extending portion 36*b*1 is arranged along a longitudinal direction of the projecting portion 44 and projects from a tip surface 44*f* of the projecting portion 44. The bent part 36*b* is located away from the tip surface 44*f* of the projecting portion 44. Thus, both outer and inner corner parts of the bent part 36*b* are exposed to outside from the first resin portion 240. In the second embodiment, the bent part 36*b* is a part bent at a right angle. Thus, the second extending portion 36*b*2 is at a right angle to the first extending portion 36*b*1 and parallel to the tip surface 44*f*. An extending direction of the second extending portion 36*b*2 is a direction toward an outer peripheral side of the base portion 42, more specifically a direction facing a side opposite to a center axis of the base portion 42. Note that the projecting portions 44, 64 may be omitted and a second connector housing portion 72 may be formed to be directly connected to the base portion 62**.

The second resin portion 60 is molded with the first resin portion 240 as an insert part as described above. This second resin portion 60 includes the projecting portion 64 and the second connector housing portion 72. The projecting portion 64 covers the projecting portion 44 and the first extending portions **36*b*1 and the bent parts 36*b* projecting from this projecting portion 64. The second extending portions 36*b*2 pass from the projecting portion 64 through a bottom portion of the second connector housing portion 72 and extend in the second connector housing portion 72. The second connector housing portion 72 surrounds the second connector terminal portions 34 on tip sides of the second extending portions 36*b*2**.

The reinforcing portion 290 is formed of an insulating material such as resin. The reinforcing portion 290 is arranged in an inner corner part of the bent part **36*b* with an outer corner part of the bent part 36*b*** exposed.

More specifically, the reinforcing portion 290 is formed into a shape having contact surfaces 291, 292 corresponding to the inner corner part of the bent part **36*b*. In the second embodiment, the reinforcing portion 290 has the contact surface 291, which can be held in surface contact with a surface of the first extending portion 36*b*1 on a side where the second extending portion 36*b*2 extends, and the contact surface 292, which can be held in surface contact with a surface of the second extending portion 36*b*2 on a side where the first extending portion 36*b*1 extends. In this embodiment, the contact surface 291 extends in a direction perpendicular to the contact surface 292. A corner part between the contact surfaces 291 and 292** may be rounded according to the shape of the inner corner part.

Further, the reinforcing portion 290 is formed to have an inclined surface 293 as a surface for reducing a dimension of the reinforcing portion 290 in a longitudinal direction of the second extending portion **36*b*2 with distance from the bent part 36*b*. More specifically, a part 290*a* of the reinforcing portion 290 extending from the second extending portion 36*b*2 to a position immediately before the tip surface 44*f* of the projecting portion 44 is formed to gradually reduce a projecting length from the first extending portion 36*b*1. In other words, this part 290*a* has a trapezoidal shape having a small dimension on the tip surface 44*f* when viewed from a direction orthogonal to both the first and second extending portions 36*b*1, 36*b*2. Out of the part 290*a*, the inclined surface 293 located on a side opposite to the second extending portion 36*b*2 is inclined to approach the first extending portion 36*b*1 with distance from the second extending portion 36*b*2. A part 290*b* of the reinforcing portion 290 on the side of the tip surface 44*f* extends from a part of the part 290*a* on the side of the tip surface 44*f* toward the tip surface 44*f*** while having the same size.

Note that the reinforcing portion 290 is set to such a size as not to be exposed in a sealing recess **77*h***.

The reinforcing portion 290 is a part integrally molded to the first resin portion 240. More specifically, the reinforcing portion 290 is a part integrally molded to the first resin portion 240 using the same resin material as the first resin portion 240. Since being connected to the first resin portion 240 via the part **290*b*, the reinforcing portion 290 is easily kept in a certain posture with respect to the first resin portion 240**.

In the second embodiment, a plurality of (here, two) the terminals 30 are held at an interval by the first resin portion 240. Two reinforcing portions 290 are separately provided to correspond to the two terminals 30. The accuracy of the positions and orientations of the two terminals 30 can be enhanced by not providing the reinforcing portion 290 between the two terminals 30. That is, in molding the first resin portion 240 with the two terminals 30 as insert parts, a positioning part of a mold can be arranged between the two terminals 30. In this way, in molding the first resin portion 240, the two terminals 30 can be more reliably positioned near the first resin portion 240.

As described above, the second resin portion 60 is molded with the terminals 30, the first resin portion 240 and the reinforcing portions 290 as insert parts in a state where the reinforcing portions 290 are arranged in the inner corner parts of the bent parts 36*b*. In this way, the second resin portion 60 covers the bent parts 36*b* and the reinforcing portions 290. More specifically, the projecting portion 44 of the second resin portion 60 covers the outer corner parts of the bent parts 36*b*. A part of the second resin portion 60 from the projecting portion 44 to the second connector housing portion 72 covers the reinforcing portions 290.

According to the relay connector 220 configured as just described, the reinforcing portions 290 are arranged in the inner corner parts of the bent parts 36*b* in molding the second resin portion 60 with the first resin portion 240 and the terminals 30 as insert parts. When a resin for forming the second resin portion 60 flows into a mold (see FIGS. 5 and 6), there is a possibility that a force for reducing the angles of the bent parts 36*b* acts on the second extending portions 36*b*2 by a resin pressure. This force is received by the reinforcing portions 290, whereby the deformation of the bent parts 36*b* by the resin pressure is suppressed. In this way, the accuracy of the positions and orientations of the terminals 30 of the relay connector 220 can be further improved.

Further, the inner corner parts of the bent parts 36*b* are covered by the reinforcing portions 290 and the outer corner parts of the bent parts 36*b* are covered by the second resin portion 60. Here, resin sinks are possibly formed in the molded resin by resin shrinkage. The resin sinks tend to become larger as a volume increases. Since the second resin portion 60 covers parts around the bent parts 36*b*, resin sinks can be reduced as compared to the case where the second resin portion 60 covers the entire bent parts 36*b*. Thus, the bent parts 36 are hardly deformed by the resin sinks due to the resin shrinkage and the like of the second resin portion 60. Also from this point, the deformation of the bent parts 36*b* is suppressed.

The reinforcing portions 290 are arranged in the inner corner parts of the bent parts 36*b*, and the outer corner parts of the bent parts 36*b* are exposed also from the reinforcing portion 290. Thus, in covering the bent parts 36*b* and the reinforcing portions 290 by the second resin portion 60, parts covering the outer corner parts of the bent parts 36*b* can have a small thickness. In this way, the enlargement of parts of the relay connector 220 corresponding to the outer corner parts of the bent parts 36*b* is suppressed. In the second embodiment, the enlargement of a central part of the base portion 62 and a part opposite to the second connector housing portion 72 is suppressed.

Further, the reinforcing portion 290 is formed into a shape having the surface 293 for reducing the dimension of the reinforcing portion 290 in the longitudinal direction of the second extending portion 36*b*2 with distance from the bent part 36*b* in the longitudinal direction of the first extending portion 36*b*1. Thus, the reinforcing portion 290 can be reduced in size near the first resin portion 240 and the second resin portion 60 for covering the reinforcing portions 290 can be reduced in size while the deformation of the bent parts 36*b* is suppressed by forming the contact surfaces 291, 292 to be brought into contact with the first and second extending portions 36*b*1, 36*b*2 as long as possible in the reinforcing portions 290.

Further, since the reinforcing portions 290 are parts integrally formed to the first resin portion 240, the reinforcing portions 290 can be easily molded together with the first resin portion 240. Note that, even if the reinforcing portions 290 are molded together with the first resin portion 240, a volume of a part surrounding the bent parts 36*b* is small and the influence on the deformation of the bent parts 36*b* by resin sinks of the reinforcing portions 290 is sufficiently suppressed since the reinforcing portions 290 are located in the inner corner parts.

Modifications based on the second embodiment are described.

Figure 9:
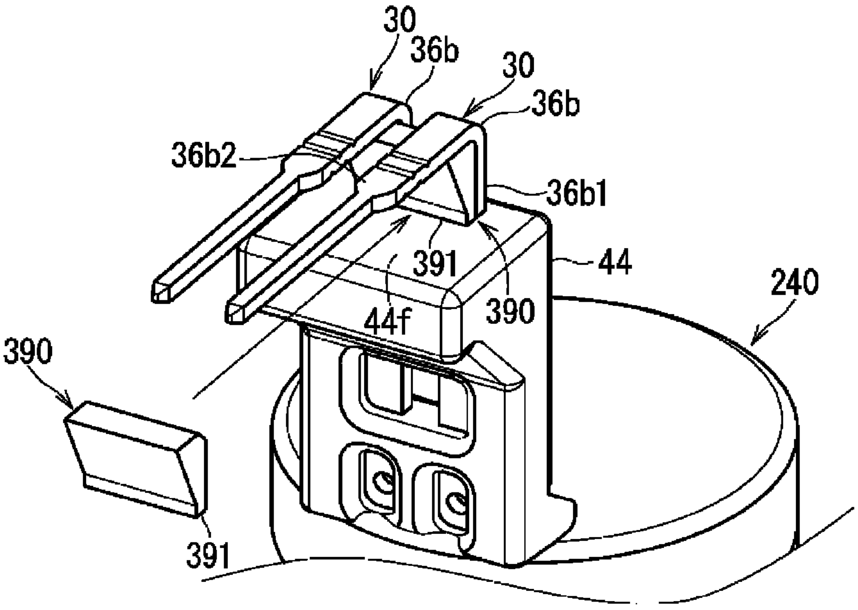
FIG. 9 is a perspective view showing a reinforcing portion, terminals and a first resin portion according to a first modification.
Figure 10:
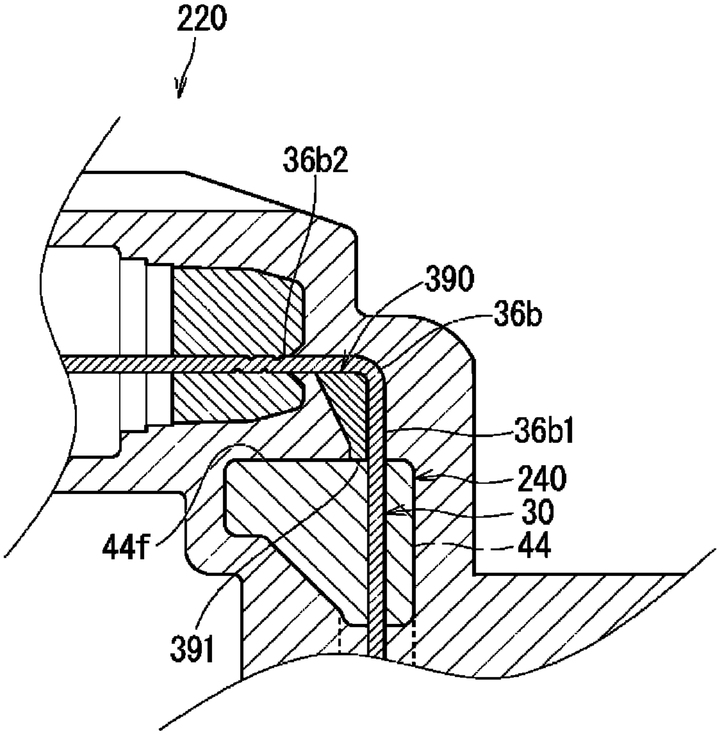
FIG. 10 is a partial section of a relay connector according to the first modification.

In a first modification shown in FIGS. 9 and 10, a reinforcing portion 390 corresponding to the reinforcing portions 290 is separate from the first resin portion 240.

The reinforcing portion 390 is configured by integrating the plurality of reinforcing portions 290 in the second embodiment to fill up a space therebetween. Thus, the reinforcing portion 390 is formed into a shape in which the same shape part is continuous along an arrangement direction of the plurality of terminals 30. In this way, bending deformation can be suppressed for the bent parts 36*b* of the plurality of terminals 30 by one reinforcing portion 390 and a mounting operation of the reinforcing portion 390 can be simplified.

The tip surface 44*f* of the projecting portion 44 in the first resin portion 240 is formed into a flat surface, and a surface 391 of the reinforcing portion 390 to be held in contact with the tip surface 44*f* of the projecting portion 44 in the first resin portion 240 is also formed into a flat surface. The reinforcing portion 390 is arranged in the inner corner parts of the bent parts 36*b* with the surface 391 of the reinforcing portion 390 held in surface contact with the tip surface 44*f* of the projecting portion 44.

In this first modification, the reinforcing portion 390 formed separately from the first resin portion 240 can be mounted into the inner corner parts of the bent parts 36*b* after the first resin portion 240 is molded with the terminals 30 as insert parts. In molding the first resin portion 240, the bent parts 36*b* can be positioned in the mold for forming the first resin portion 240 since the reinforcing portion 390 is not present between the plurality of bent parts 36*b*. The second resin portion 60 can be molded by setting the first resin portion 240 holding the terminals 30 and the reinforcing portion 390 in the mold for molding the second resin portion 60 after the reinforcing portion 390 is mounted on the first resin portion 240 and the terminals 30.

Thus, also by the first modification, the deformation of the bent parts 36*b* by a resin pressure and resin sinks in molding the second resin portion 60 can be suppressed by the reinforcing portion 390.

Further, the reinforcing portion 390 can be molded by a mold or the like separately from the terminals 30. Thus, the deformation of the bent parts 36*b* of the terminals 30 by a resin pressure and resin sinks is suppressed in molding the reinforcing portion 390. Further, the processing, the deformation and the like of the bent parts 36*b* are facilitated after the molding of the first resin portion 240. For example, after the first resin portion 240 is molded with pre-processed members for forming the terminals 30 as insert parts, the pre-processed members can be bent to form the bent parts 36*b*. Further, for example, if a bending angle of the bent part 36*b* deviates from a designed bending angle, the bent part 36*b* can be corrected before or when the reinforcing portion is mounted.

Further, the reinforcing portion 390 can be brought into surface contact with the first and second extending portions 36*b*1, 36*b*2 with the surface 391 of the reinforcing portion 390 held in contact with the tip surface 44*f* of the projecting portion 44. Thus, an arranged state of the reinforcing portion 390 is stabilized. Particularly, since the first resin portion 240 supports the reinforcing portion 390 with a surface, the reinforcing portion 390 is hardly inclined and the deformation of the bent parts 36*b* can be effectively suppressed.

The reinforcing portion 390 may be set to such a size as to be press-fit into a part surrounded by the inner corner parts of the bent parts 36*b* and the first resin portion 240. For example, a dimension of the reinforcing portion 390 in the longitudinal direction of the first extending portion 36*b*1 may be set to be larger than a distance between a surface of the second extending portion 36*b*2 on the side of the inner corner part and the tip surface 44*f* of the projecting portion 44 (within a range that the reinforcing portion 390 can be press-fit).

In this way, the reinforcing portion 390 is hardly shifted and detached with the reinforcing portion 390 mounted between the inner corner parts of the bent parts 36*b* and the first resin portion 240, wherefore the bending deformation of the bent parts 36*b* is effectively suppressed.

Figure 11:
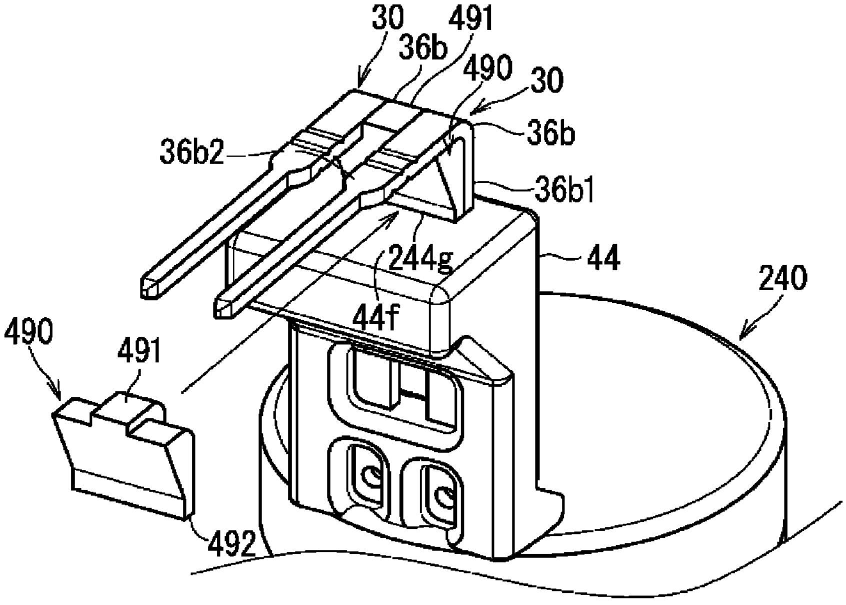
FIG. 11 is a perspective view showing a reinforcing portion, terminals and a first resin portion according to a second modification.
Figure 12:
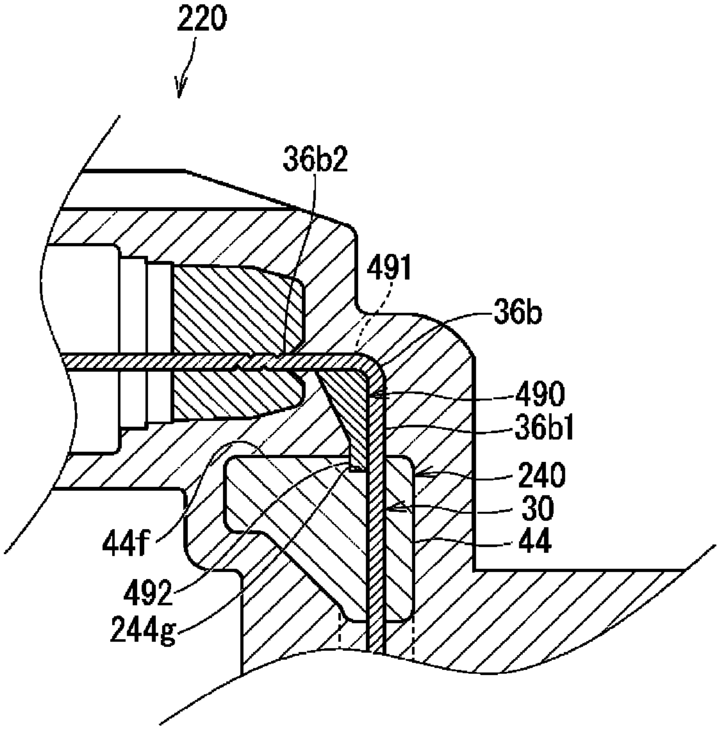
FIG. 12 is a partial section of a relay connector according to the second modification.

In a second modification shown in FIGS. 11 and 12, a reinforcing portion 490 is separate from the first resin portion 240, similarly to the reinforcing portion 390 of the first modification. In this modification, the reinforcing portion 490 is configured by forming a protrusion 491 to be fit between the plurality of terminals 30 on the reinforcing portion 390. Further, the reinforcing portion 490 is configured by forming a fit-in portion 492 to be fit into a recess 244*g* of the first resin portion 240 on the reinforcing portion 390.

More specifically, a part of the reinforcing portion 490 to be arranged between the plurality of bent parts 36*b* is formed with the protrusion 491 extending along the bent parts 36*b*. A part of the protrusion 491 can be fit between a plurality of the first extending portions 36*b*1. Another part of the protrusion 491 can be fit between a plurality of the second extending portions 36*b*2. One of the part of the protrusion 491 to be fit between the plurality of first extending portions 36*b*1 and the part of the protrusion 491 to be fit between the plurality of second extending portions 36*b*2 may be omitted.

A surface of the reinforcing portion 490 facing the first resin portion 240 serves as the fit-in portion 492 extending longer than in the reinforcing portion 390. A part facing the fit-in portion 492, out of the tip surface 44*f* of the projecting portion 44, is formed with the recess 244*g*. The fit-in portion 492 may be set to such a size as to be press-fit into the recess 244*g*. A surface of a lowermost part of the fit-in portion 492 preferably comes into surface contact with the back surface of the recess 244*g*.

According to this modification, the protrusion 491 of the reinforcing portion 490 can be fit between the plurality of terminals 30. In this way, the reinforcing portion 490 is stably arranged in the inner corner parts of the bent parts 36*b*. In this way, the bending deformation of the bent parts 36*b* is more reliably suppressed by the reinforcing portion 490. Further, an interval between the plurality of terminals 30 can be held constant by the protrusion 491, and the accuracy of the positions and orientations of the terminals 30 can be further improved.

Further, since the fit-in portion 492 as a part of the reinforcing portion 490 is fit in the recess 244*g*, the reinforcing portion 490 is stably arranged in the inner corner parts of the bent parts 36*b* and the shift and detachment of the reinforcing portion 490 are more reliably suppressed.

Note that although the second embodiment has been described based on the relay connector, a configuration in which the reinforcing portion(s) 290, 390, 490 is/are arranged in the bent parts 36*b* of the terminals 30 is applicable to various connectors including a terminal having a bent part without being limited to relay connectors.

[Addendums]

The present disclosure also discloses the following aspects.

A first aspect relates to a relay connector provided with a terminal including a first connector terminal portion, a second connector terminal portion and an intermediate portion, a first resin portion holding the terminal and a second resin portion molded with the first resin portion as an insert part, the first resin portion including a first resin body portion to be arranged in the second resin portion and an exposed portion to be exposed from the second resin portion, the first resin body portion covering a part of the intermediate portion, the exposed portion including a bottomed tubular first connector housing portion surrounding an outer periphery of the first connector terminal portion, and the second resin portion including a second resin body portion for covering the first resin body portion and another part of the intermediate portion and a bottomed tubular second connector housing portion for surrounding an outer periphery of the second connector terminal portion.

According to this relay connector, in molding the second resin portion, the terminal is held by the first resin body portion in a mold. In this way, the deformation of the terminal is suppressed. Further, since the first resin portion can be positioned using the first connector housing portion surrounding the outer periphery of the first connector terminal portion in molding the second resin portion, the first resin portion holding the terminal is more reliably positioned.

A second aspect relates to the relay connector according to the first aspect in which the first resin body portion is connected to the exposed portion in a direction intersecting an axial direction of the first connector housing portion.

In this way, the first connector housing portion can be positioned using inner and outer surfaces and the like of a bottom portion of the first connector housing portion, and the first resin portion is more reliably positioned.

A third aspect relates to the relay connector according to the second aspect in which a positioning recess is formed in an outward facing part of the exposed portion on a side opposite to an opening of the first connector housing portion. In this case, since the first connector housing portion can be positioned using the positioning recess, the first resin portion is more reliably positioned.

A fourth aspect relates to the relay connector according to any one of the first to third aspects in which a positioning groove extending from the opening of the first connector housing portion toward a bottom side is formed in an outward facing part of the exposed portion. In this case, since the exposed portion is positioned using the inner surface of the positioning groove, the first resin portion is more reliably positioned.

A fifth aspect relates to the relay connector according to any one of the first to fourth aspects in which the second resin body portion covers a part of the intermediate portion extending from the first resin body portion, and the first resin body portion includes a thin portion and a thick portion located closer to the second connector terminal portion than the thin portion and thicker than the thin portion.

In this case, a part near the second connector terminal portion, out of the second resin body portion, may not cover the first resin body portion. Thus, a part near the second connector housing portion, out of the relay connector, can be reduced in size. Further, a force for deforming the terminal is received by the thick portion in molding the second resin portion. In this way, the deformation of the terminal can be suppressed.

A sixth aspect relates to the relay connector according to the fifth aspect in which the thick portion more largely projects in a part around the intermediate portion than in other parts with respect to the thin portion. In this case, a projecting amount of the thick portion can be reduced in the other parts on the outer periphery of the relay connector. In this way, the shape of the relay connector can be adjusted according to a positional relationship of the connector and another device and the like in an exterior environment of the relay connector.

A seventh aspect relates to the relay connector according to the sixth aspect in which the intermediate portion includes a bent part bent outside the first resin portion and in the second resin portion, the second resin body portion covers at least a part of the intermediate portion closer to the first connector terminal portion than the bent part, the thick portion more largely projects in an extending direction from the bent part to the second connector terminal portion than in other parts around the intermediate portion. In this way, if the terminal is bent halfway, a part outside that bent part can be reduced in size.

An eighth aspect relates to the relay connector according to any one of the first to seventh aspects in which the second resin portion is provided with a sealing member.

In this case, since the second resin portion is formed with the first resin portion as an insert part, the surface of the second resin portion can be more smoothly formed. In this way, sealability by the sealing member can be improved.

Further, the present disclosure also discloses the following ninth aspect.

The ninth aspect relates to a connector provided with a terminal including a connector terminal portion and an intermediate portion connected via a bent part, a first resin portion holding a part of the terminal with the bent part exposed to outside, and a second resin portion molded with the first resin portion as an insert part, the second resin portion including a base portion covering a part of the first resin portion holding the intermediate portion and a connector housing portion surrounding the connector terminal portion, the intermediate portion being provided at a position deviated from a center of the base portion, and the connector housing portion extending toward an outer peripheral side of the base portion.

According to this aspect, the intermediate portion is provided at the position deviated from the center of the base portion and the connector housing portion extends toward the outer peripheral side of the base portion. In such a configuration, a reinforcing portion is arranged in an inner corner part of the bent part with an outer corner part of the bent part exposed. Thus, the second resin portion covers the reinforcing portion on a side, where the connector terminal portion extends, with respect to the intermediate portion, but can directly cover the outer corner part of the bent part on an opposite side. In this way, a part on the outer corner part of the bent part can be reduced in size.

The above first to eighth aspects and, further, the ninth aspect can be also combined with the respective configurations (1) to (7) listed as the embodiments of the present disclosure.

For example, in the first aspect, a configuration relating to the reinforcing portion of (1) may be applied.

Further, for example, a reinforcing portion arranged in the inner corner part of the bent part with the outer corner part of the bent part exposed, like the reinforcing portion of (1), may be further provided in the ninth aspect.

Note that the respective components described in the respective embodiments and the respective modifications described above can be combined as appropriate without contradicting each other.

LIST OF REFERENCE SIGNS

16, 18 connector
16*a*, 18*a* connector terminal
18P lock piece
18Ph locking hole
19 case
19*h* mounting hole
20, 220 relay connector
22 first connector portion
24 second connector portion
30 terminal
32 first connector terminal portion
34 second connector terminal portion
36 intermediate portion
36*a*, 36*b* bent part
36*b*1 first extending portion
36*b*2 second extending portion
36*g* groove
36*h* through hole
40, 240 first resin portion
41 first resin body portion
42 base portion
43 base frame portion
43*a* bottom portion
43*h* window portion
44 projecting portion
45 thin portion
45*h*1, 45*h*2 window portion
46 thick portion
50 exposed portion
51 positioning recess
51*a* bottom surface
51*f* side surface
52 first connector housing portion
53, 54, 55, 56 peripheral wall portion
53*h* locking hole
57 bottom portion
58 intermediate frame portion
59 positioning groove
59*a* bottom surface
59*b* side surface
60 second resin portion
61 second resin body portion
62 base portion
62*g* peripheral groove
64 projecting portion
68 screwed portion
68*a* metal annular member
68*h* screw insertion hole
72 second connector housing portion
73 peripheral wall portion
75*a* locking protrusion
75*b* guide protrusion
77 bottom portion
77*h* sealing recess
80, 84 annular sealing member
82 terminal sealing member
100 first mold
102, 112 mold surface
104 positioning annular groove
105 inner part

106 first terminal positioning hole
107 groove
108*f* positioning surface
110 second mold
113 bottom portion positioning surface
113P positioning protrusion
114 second terminal positioning hole
120 injection port
244*g* recess
290, 390, 490 reinforcing portion
291 contact surface
292 contact surface
293 inclined surface
391 surface
491 protrusion
492 fit-in portion

What is claimed is:

1. A connector, comprising:
a terminal including a bent part;
a first resin portion for holding a part of the terminal so that the bent part is partly exposed at an outer surface of the first resin portion;
a second resin portion that is molded while using the first resin portion as an insert member so as to cover the bent part; and
a reinforcing portion that is disposed at an inner corner of the bent part to reinforce the bent part,
wherein the outer corner of the bent part is exposed from the first resin portion before molding of the second resin portion and is covered by the second resin portion after the molding.

2. The connector of claim 1, wherein:
the terminal includes a first extending portion extending from the bent part toward the first resin portion and a second extending portion extending from the bent part in a direction different from that of the first extending portion, and
the reinforcing portion includes an inclined surface that gradually decreases a thickness of the reinforcing portion along a longitudinal direction of the second extending portion as a distance from the bent part increases in a longitudinal direction of the first extending portion.

3. The connector of claim 1, wherein the reinforcing portion is a part integrally molded to the first resin portion.

4. The connector of claim 1, wherein the reinforcing portion is separate from the first resin portion.

5. The connector of claim 4, wherein the reinforcing portion is set to such a size as to be press-fit into a part surrounded by the inner corner part of the bent part and the first resin portion.

6. The connector of claim 4, wherein:
a plurality of the terminals are provided, and
the reinforcing portion includes a protrusion to be fit into between the plurality of terminals.

7. The connector of claim 4, wherein:
the first resin portion is formed with a recess, a part of the reinforcing portion being fit into the recess, and
the reinforcing portion is arranged in the inner corner part of the bent part with the part of the reinforcing portion fit in the recess.

8. A connector, comprising:
a terminal including a bent part;
a first resin portion for holding a part of the terminal so that the bent part is partly exposed at an outer surface of the first resin portion;
a second resin portion that is molded while using the first resin portion as an insert member so as to cover the bent part; and
a reinforcing portion that is disposed at an inner corner of the bent part to reinforce the bent part,
wherein the reinforcing portion is separate from the first resin portion.

9. The connector of claim 8, wherein:
the terminal includes a first extending portion extending from the bent part toward the first resin portion and a second extending portion extending from the bent part in a direction different from that of the first extending portion, and
the reinforcing portion includes an inclined surface that gradually decreases a thickness of the reinforcing portion along a longitudinal direction of the second extending portion as a distance from the bent part increases in a longitudinal direction of the first extending portion.

10. The connector of claim 8, wherein the reinforcing portion is a part integrally molded to the first resin portion.

11. The connector of claim 8, wherein the reinforcing portion is set to such a size as to be press-fit into a part surrounded by the inner corner part of the bent part and the first resin portion.

12. The connector of claim 8, wherein:
a plurality of the terminals are provided, and
the reinforcing portion includes a protrusion to be fit into between the plurality of terminals.

13. The connector of claim 8, wherein:
the first resin portion is formed with a recess, a part of the reinforcing portion being fit into the recess, and
the reinforcing portion is arranged in the inner corner part of the bent part with the part of the reinforcing portion fit in the recess.

* * * * *